Oct. 5, 1965 A. D. BASKIN ETAL 3,210,234
RIBBED LAMINATE
Filed July 5, 1962 2 Sheets-Sheet 1
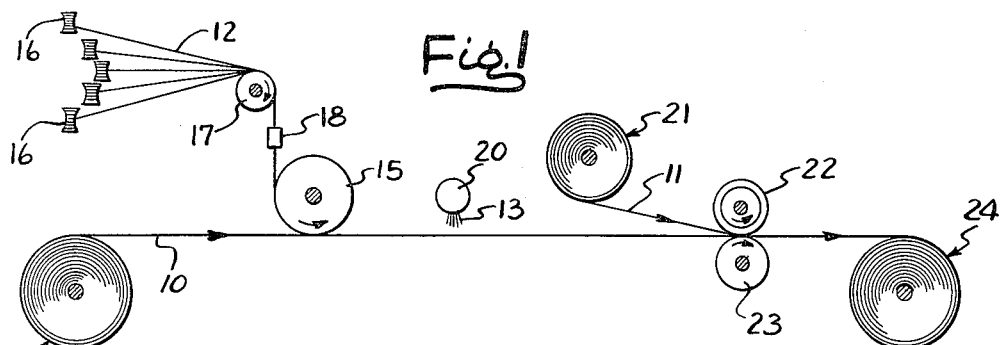
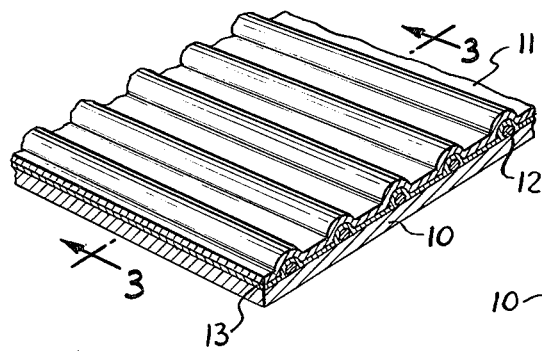
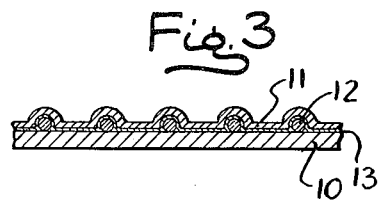
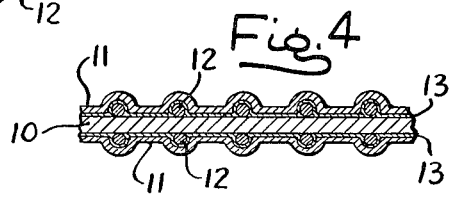
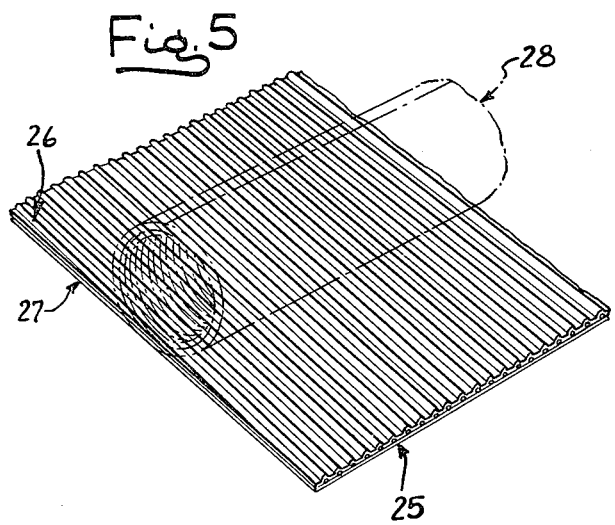
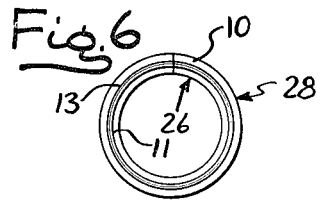
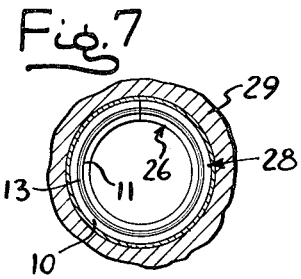
INVENTORS
AARON DAVID BASKIN
BY KENNETH M. JOHNSON
Gary, Desmond & Parker
ATTYS

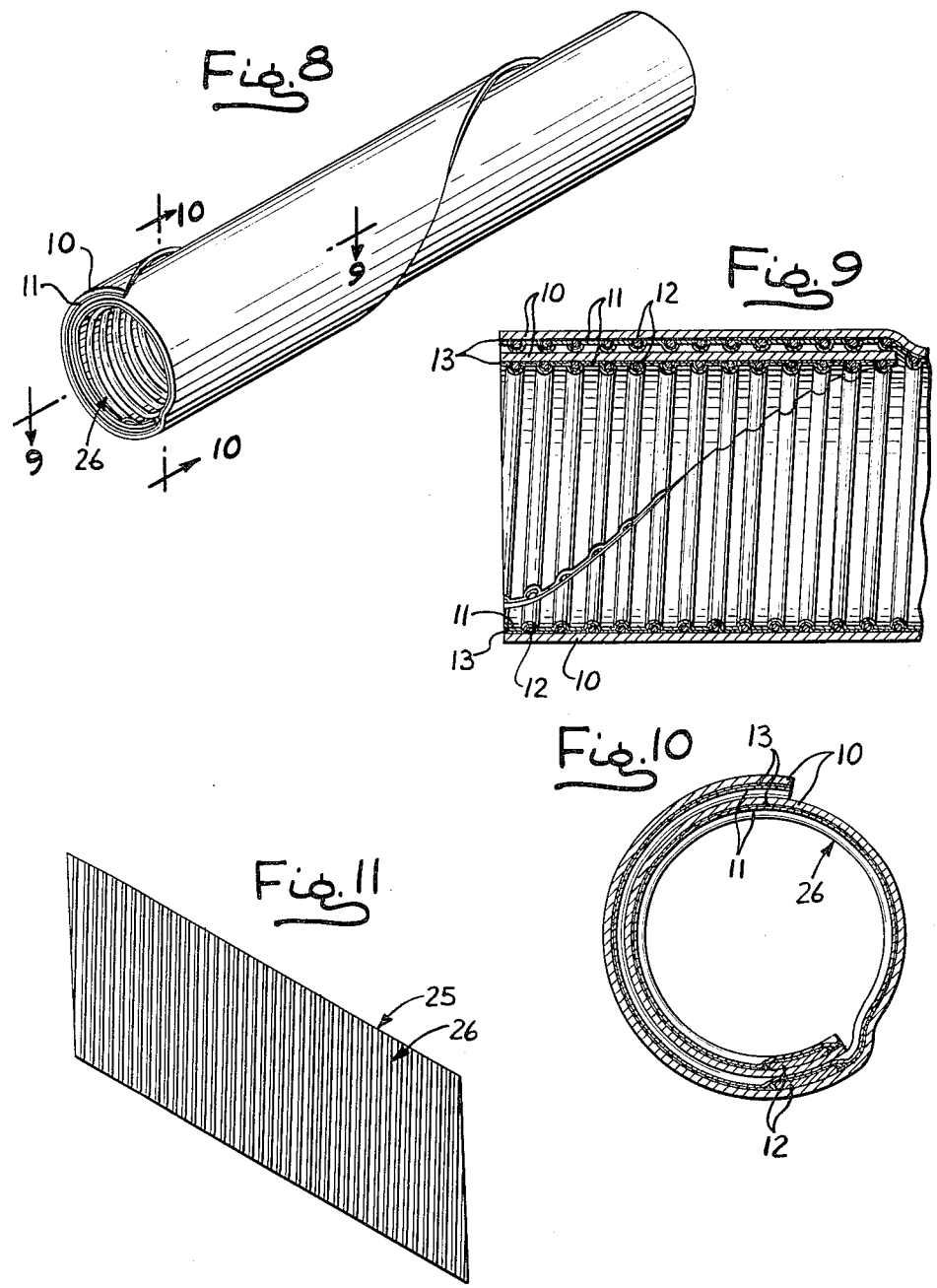

United States Patent Office 3,210,234
Patented Oct. 5, 1965

3,210,234
RIBBED LAMINATE
Aaron David Baskin, Highland Park, and Kenneth M. Johnson, Chicago, Ill., assignors to Arvey Corporation, Chicago, Ill., a corporation of Delaware
Filed July 5, 1962, Ser. No. 207,563
3 Claims. (Cl. 161—119)

This invention relates to the production of novel laminated material.

It is a particular object of the present invention to provide a flexible laminate having raised parallel ribs.

Another object of this invention is to provide a coated paper product having raised parallel ribs on at least one face and which is electrically neutral, i.e. will not conduct electrical current or magnetic flux.

Another object of this invention is to provide an electrically neutral coated paper base product having raised parallel coated ribs on at least one face and which can be readily formed into various shapes and objects.

Still another object of the present invention is to provide an electrically neutral coated paper base product having raised parallel ribs on at least one face which can be readily formed into an internally and/or externally screw-threaded coated paper tubing.

These and other objects of the present invention will be readily apparent from the following specification and accompanying drawings, wherein:

FIG. 1 is a side elevational view of a diagrammatic arrangement of apparatus for producing the laminate for the present invention.

FIG. 2 is a fragmentary perspective view of the laminate formed in accordance with the present invention; and FIG. 3 is a section on the line 3—3 of FIG. 2.

FIG. 4 is a section similar to that of FIG. 3 of a modified form of construction, namely, a sheet carrying ribs on opposed faces thereof.

FIG. 5 is a fragmentary perspective view of the laminate of the present invention similar to that of FIG. 2 but of reduced size and showing in dotted lines a tubular product formed therefrom.

FIG. 6 is an end elevational view of the tubular product shown dotted in FIG. 5.

FIG. 7 is a view similar to that of FIG. 6 showing the tube thereof disposed in a holder body.

FIG. 8 is a perspective view of another tube formed from the laminate of the present invention.

FIG. 9 is a section on the line 9—9 of FIG. 8.

FIG. 10 is a section on the line 10—10 of FIG. 8.

FIG. 11 is a plan view of a section of laminate formed in accordance with the present invention employed in making the tube of FIG. 8.

Referring to the drawings, the reference numeral 10 indicates a base or intermediate layer preferably composed of flexible felted fibrous sheet material such as for example kraft paper.

The form of laminate shown in FIGS. 2 and 3 carries on one face a ply of plastic sheet material 11 and a plurality of spaced parallel threads 12 disposed and adhesively bonded between the sheets 11 and 10 by means of a layer of adhesive 13, the plastic sheet 11 being molded and adhered to the threads 12 and the upper base 10 between the threads so as to provide a ribbed construction. The section of laminate shown in FIG. 4 is composed of an intermediate layer of paper 10 and carries layers of plastic 11 on opposed faces thereof with spaced parallel threads 12 bonded between the intermediate paper layer 10 and the opposed plastic sheet material layers 11—11 and bonded by means of interposed layers of adhesive 13 so as to provide a dual ribbed construction.

The laminate of the present invention may be formed in accordance with the arrangement diagrammatically illustrated in FIG. 1. Here the paper base sheet 10 is fed from a supply roll, generally indicated as 14, and as it moves forwardly under the roll 15 a plurality of strands 12 from the reels 16 are fed over the roll 17 to the roll 15 and in their passage thereto are maintained in spaced parallel relation by the comb means 18.

As the base sheet 10 with the threads 12 disposed thereover passes by the roller 15, adhesive 13 from dispenser 20, preferably in heated condition, is sprayed onto the threads 12 and paper base 10. Thereafter, a layer of plastic 11, fed from the roll generally indicated as 21, is disposed over the adhesively coated threads 12 and the upper surface of the paper sheet 10 and the assembly bonded together by passing through the rolls 22 and 23. The lower roll 23 is preferably solid whereas the upper roll 22 is resilient so as to smoothly adhere the plastic sheet 11 over the threads 12 and to the paper base 10 between the threads and to thereby provide a ribbed composite as shown in FIG. 2.

The laminate is thereafter rolled up for storage on a roll generally indicated as 24. In passing to roll 24, suitable means may be employed acting against the laminate for cooling the adhesive if necessary. It is also to be understood, although not shown, that if desirable or necessary heating means may be employed in contact with either roll 21 or the plastic sheet 11 drawn therefrom in its passage to roll 22 for subjecting it to heat for softening it and to aid in molding it about the threads 12.

Although FIG. 1 shows lamination to one side of the paper base 10, for producing the product of FIG. 4, starting roll 14 may be replaced by the roll 24 and the process repeated on the backing of the base 10.

When the product of the present invention is to be utilized in an electrical apparatus, it is preferred that the base 10 be electrically neutral, that is, a non-conductor of electricity or magnetic flux. The commercially available neutral electric kraft papers are satisfactory for this purpose. Mineral sulfite kraft papers would not be preferred for this purpose since they might be conductors, although such papers are satisfactory for other applications. The thickness of the paper layer 10 is determined by the use to which the product is to be applied. For example, when the product is to be formed into screw-threaded electrically neutral tubing, it is preferred to utilize an electrically neutral kraft paper having a thickness of from about 0.0001 to about 0.01 inch for maximum strength at the flexibility required in the formation of the tubing.

Threads 12 preferably can be formed from the synthetic fibers such as rayon, nylon, Dacron, Dynel, and the like. Dacron is a registered trademark for a fiber formed by the condensation of dimethylterephthalic acid and ethylene glycol; while Dynel is a registered trademark for a fiber of 40% acrylonitrile and 60% vinyl chloride. The synthetic fiber threads are preferred for their high tensile strength and other properties. A single strand of the fiber can be used if it is of sufficient strength and diameter, for example a monofilament of nylon, wherein monofilaments can be obtained with diameters as hereinafter specified; or a thread comprised of several strands of twisted fiber can be utilized to obtain the desired strength and diameter.

The coating 11 is composed of a plastic sheet material. Thin plastic sheet materials which are flexible and can thereby evenly cover and embrace the threads 12 on paper base 10 are suitable for this purpose. Coating 11 is preferably of a sheet material having a low co-efficient of friction, high tensile strength and high tear resistance. Examples of the suitable plastic sheet materials are: polyethylene sheets, nylon sheets, flexible vinyl film, oriented styrene sheets, oriented acrylic sheets, films of polyethylene terephthalate resins, and the like. A preferred sheet material for use as coating 11 in the product of this invention, particularly in electric apparatus applications, is a film of polyethylene terephthalate, which is commercially available under the trademark "Mylar," registered to E. I. du Pont de Nemours and Co.

It is desirable that the plastic sheet material 11 be sufficiently thin so that it can be molded over and about the threads 12 and leave the latter substantially elevated above the planar surface of the laminate.

The coating 11 can be from about 0.00025 to about 0.005 inch thick. The thickness of the coating 11 is determined by the diameter and spacing of threads 12 utilized. The coating 11 must be sufficiently thin to evenly coat the paper base 10 and the threads 12, particularly at the junction of said base and threads.

The coating 11 is tightly held to the paper base 10 and threads 12 by adhesive means 13 interposed between coating 11 and paper base 10 and threads 12. Adhesive 13 is preferably a synthetic resin-based adhesive having good adherence to both plastic sheet material and the paper base. A preferred adhesive for use as adhesive 13 in the product of this invention is a polymeric adhesive consisting of a mixture of polyester and vinyl resins. A particularly preferred adhesive, especially when "Mylar" is used as the coating 13, is a polymeric adhesive consisting of an approximately equal weight mixture of polyester and vinyl resins having a Ford Open Cup viscosity of approximately 0.72 minute, as determined with a number 4 Ford Open Cup, and this is preferably employed in heat fluidized condition.

The coated paper products of the present invention are highly useful in many fields of application. The products of this invention are particularly useful in the formation of electrically neutral screw-threaded tubing. The electrically neutral coated paper products of this invention can be formed into tubing by methods common to the art. If a coated paper product of the present invention having raised parallel ribs on one planar side is utilized in the formation of the tubing, then the tubing will possess internal or external screw-threading depending on the direction in which the rolling operation is performed. If a coated paper product, as described herein, having raised parallel ribs on both planar sides is utilized, then the tubing formed therefrom will have both internal and external screw-threading.

Electrically neutral, screw-threaded tubing is particularly useful in the manufacture of various electronic components. For example, the tubing can be used in tuning slugs for variable transformers, capacitors, and the like, by combining screw means with a transformer core slug, or capacitor plates, and threading said screw means into or onto the screw-threading of the tubing. Thus a revolution of the tubing held in a longitudinally fixed relationship, will advance or retract the screw means and hence cause a corresponding movement of the transformer core or capacitor plate, accomplishing the desired adjustment in the apparatus.

Thus, FIG. 5 illustrates the production of a tube from a single layer of sheet material having one surface thereof provided with ribs as illustrated in the detail of FIG. 2. It will be noted that the sheet, generally indicated as 25, is edgewise cut on a bias so that the ribs generally indicated as 26 are inclined to the side edge, as will be noted at the edge generally indicated as 27. By rolling the sheet 25 into a self-sustaining edge abutting tube as shown in the end view of FIG. 6, the ribs 26 will form internal screw threads. If desired, the tube generally indicated as 28 may be disposed in a holder body 29, as shown in FIG. 7, for rigidity or for other reason.

FIG. 8 shows a self-sustaining tube composed of the laminate of the present invention in a manner provided with an internal helical thread, the tube of FIG. 8 being produced by winding in a helical manner the laminate of FIG. 11 which is cut in the form of a parallelogram. This parallelogram is wound in overlapping manner as shown in FIGS. 9 and 10 to produce a tube with internal thread, and being in part overlapped is a reinforced self-sustaining construction.

Although we have shown and described the laminate of the present invention as particularly adapted for use in the production of electrically neutral screw threaded tubing, it will be understood by those skilled in the art that our laminate may be put to other uses. For example, the rib laminated construction can be used for production of tubes of a reinforced nature by reason of the internally bonded strands or threads 12, or in the production of otherwise shaped or even flat bodies wherein one or more layers of the laminate of the present invention may be secured together. It will be further evident that when securing a plurality of plies of the laminate of the present invention together air cells are formed therebetween and thus by assembling a plurality of layers of the laminate of the present invention heat and cold insulating bodies of novel nature are provided.

Although we have shown and described the preferred embodiments of our invention, it will be understood by those skilled in the art that changes may be made in the details thereof without departing from its scope as comprehended by the following claims.

We claim:

1. A coated paper product having raised parallel ribs on at least one side adapted for forming into electrically neutral screw-threaded tubing comprising an electrically neutral kraft paper base having a thickness of from about 0.0001 to about 0.01 inch, parallel threads of organic fiber selected from the group consisting of rayon, nylon, the condensation product of dimethylterephthalic acid and ethylene glycol, and a fiber of 40% acrylonitrile and 60% vinyl chloride supported upon at least one side of the base and in continuous contact with the base, and a continuous coating of thin deformable plastic sheet of polyethylene terephthalate having a thickness of from about 0.00025 to about 0.005 inch and having a low co-efficient of friction, high tensile strength and high tear resistance, said coating being of uniform thickness and adhesively bonded to the threads and the thread-supporting side of the base by adhesive means interposed between the coating and the threads and base.

2. A coated paper product having raised parallel ribs on at least one side adapted for forming into electrically neutral screw-threaded tubing comprising an electrically neutral kraft paper base having a thickness of from about 0.0001 to about 0.01 inch, a plurality of equally spaced parallel threads of organic fiber selected from the group consisting of rayon, nylon, the condensation product of dimethylterephthalic acid and ethylene glycol, and a fiber of 40% acrylonitrile and 60% vinyl chloride supported upon at least one side of the base and in continuous contact with the base, and a continuous coating of thin deformable plastic sheet of polythylene terephthalate having a thickness of from about 0.00025 to about 0.005 inch and having a low co-efficient of friction, high tensile strength and high tear resistance, said coating being of uniform thickness and adhesively bonded to the threads and the thread-supporting side of the base by a continuous layer of polymeric adhesive interposed between the coating and the threads and base.

3. A coated paper product having raised parallel ribs on both sides adapted for forming into electrically neutral screw-threaded tubing comprising an electrically neutral kraft paper base having a thickness of from about 0.0001 to about 0.01 inch, a plurality of equally spaced parallel threads of synthetic organic fiber selected from the group consisting of rayon, nylon, the condensation product of dimethylterephthalic acid and ethylene glycol, and a fiber of 40% acrylonitrile and 60% vinyl chloride supported on both sides of the base and in continuous contact with the base, and a continuous coating of thin deformable plastic sheet of polyethylene terephthalate having a thickness of from about 0.00025 to about 0.005 inch and having a low co-efficient of friction, high tensile strength and high tear resistance, said coating being of uniform thickness and adhesively bonded to the threads and each side of the base by a continuous layer of polymeric adhesive interposed between the coating and the threads and base.

References Cited by the Examiner
UNITED STATES PATENTS

| | | | |
|---|---|---|---|
| 2,282,168 | 5/42 | Cunnington | 161—144 X |
| 2,744,041 | 5/56 | Balchen | 161—123 |
| 2,897,841 | 8/59 | Hui et al. | 156—178 X |
| 2,961,365 | 11/60 | Sroog. | |
| 3,068,135 | 12/62 | Bower | 161—119 X |
| 3,091,262 | 5/63 | Donaldson | 161—143 XR |

ALEXANDER WYMAN, *Primary Examiner.*

EARL M. BERGERT, *Examiner.*